United States Patent [19]

Maheswaran

[11] 3,855,408

[45] Dec. 17, 1974

[54] POULTRY VACCINE

[75] Inventor: S. K. Maheswaran, Minneapolis, Minn.

[73] Assignee: The Regents of the University of Minnesota, Minneapolis, Minn.

[22] Filed: July 16, 1973

[21] Appl. No.: 379,356

[52] U.S. Cl. .................................................. 424/92
[51] Int. Cl. ............................................. A61k 23/00
[58] Field of Search ....................................... 424/92

[56] References Cited
UNITED STATES PATENTS
2,787,576  4/1957  Kakavas et al. ...................... 424/92

OTHER PUBLICATIONS

Bierer, B. W. et al., Poultry Sci.47:1258–1260 (1968) "Continuous Use of a Live Vaccine in the Drinking Water against Fowl Cholera Infection in Turkeys."

Langpap, T. J. et al., Avian Dis.14:491–493 (1970) "Observations on the Prevalence of Avian Pasteurella Molticoida Serotypes."

Heddleston, K. L. et al., Avian Dis.14:626–635 (1970) "Fowl Cholera: Immune Response in Turkeys."

*Primary Examiner*—Shep K. Rose

[57] ABSTRACT

A stable avirulent antibacterial mutant strain of *Pasteurella multocida* used as a live vaccine in poultry induces a high degree of protection against fowl cholera. The live vaccine is preferably administered orally by introduction into drinking water, but has been found to be avirulent in all of the normal routes of administration against the whole range of *P. multocida* serotypes.

4 Claims, No Drawings

POULTRY VACCINE

This invention relates to a stable avirulent antibacterial mutant strain of *Pasteurella multocida* and to its use as a live vaccine administered to poultry as a prophylaxis against fowl cholera.

Pasteurellosis (fowl cholera) is one of the most serious of the bacterial poultry diseases. It particularly plagues the turkey grower in the United Stated. Turkey growers who have had persistent cholera problems vaccinate their flocks regularly with bacterins (killed bacteria). Commercial bacterins have been uneconomical and impractical because, to be effective, they have to be injected parenterally. Bacterins are only effective for short periods when the disease-causing strains in the flock are immunologically similar (same serotype) to those included in the commercial bacterins. Live vaccine, on the other hand, induces a long lasting immunity against the whole range of *P. multocida* serotypes.

Since the classical work of Pasteur, many investigators have questioned the value of live vaccine against fowl cholera. The stability and immunogenic value of these avirulent strains, when used as a vaccine under field conditions, has been questionable.

Scientists at the University of Minnesota embarked upon a program to develop an effective, safe, live vaccine against fowl cholera to be tested under field conditions, To accomplish this, extensive investigations were under-taken to attenuate or reduce the virulence of several *P. multocida* isolates. Several techniques were used, such as serial passage through turkey and chick embryos and passage through the thoracic cavities of rabbits and guinea pigs. The results were disappointing. Efforts were then directed toward insolating a mutant which would be avirulent but still retain its immunogenecity. One high temperature encapsulated mutant strain isolate, identified as M-2283, has resulted and the immunizing potential of this strain has been evaluated.

The parent strain of mutant M-2283 was isolated from a parent strain of *P. multocida* (V-2283) originally isolated from a turkey that had died of cholera. Both the parent strain and mutant were heavily encapsulated and belonged to serotype 4 as determined by the Heddleston's microimmunodiffusion technique (Reported at the 20th Western Poultry Diseases conference, University of California, Davis, Calif. Mar. 23-24, 1971). This mutant has been found to be avirulent to turkeys when administered orally in drinking water, endotracheally and by parenteral, i.e., subcutaneous and intramuscular, routes. Extensive laboratory trails have shown that mutant M-2283, when administered orally in the drinking water or endotracheally into 8-week old turkeys induced a high degree of protection against a virulent homologous strain (P-1162) and also to heterologous strains (P-1059, X-73, P-1702 and B-1001). The results of these experiments also revealed that this live vaccine induced a localized protection in the respiratory system of these turkeys.

A deposit of a culture of the mutant strain of *Pasteurella multocida* (M-2283) has been deposited in accordance with the *Notice of Apr.* 29, 1971 (886 O.G. 638) in the American Type Culture Collection, Rockville, MD, and is identified as ATCC 21955.

Many investigators believe that the only way to control fowl cholera is by efficient immunization. The most economical and practical manner of administering the vaccine in poultry is via drinking. It has been found that strain M-2283 functions as an efficient vaccine in the drinking water. It is a very stable mutant, avirulent to turkeys unless given intravenously in very high doses. The organism has remained viable in drinking water containing skim milk for 46 hours.

Epidemiological studies on fowl cholera indicate that the organism has a respiratory route of infection. Contaminated water is the most probable source of infection. Protection from the disease can be achieved if the respiratory systems of the turkeys contain protective antibodies. Administration of the avirulent vaccine in the drinking water is efficacious, practical and economical.

Successful field studies have been completed with 69,000 turkeys. The experimental work is summarized as follows:

Turkeys. Used in each experiment were Wrolstad white turkeys approximately 8 weeks old obtained as hatchmates from the same source and raised in isolation.

Vaccination. For vaccination purposes, lyophilized iridescent colonies of *P. multocida* mutant strain M-2283 were reconstituted and propagated in dextrose starch broth (Difco) for 12-13 hours. During this period they were in their log phase of growth. Turkeys were vaccinated by various routes such as drinking water (DW), endotracheally (ET), and subcutaneously (SC), with or without adjuvant. Exposure via DW was accomplished by diluting a known volume of culture with a known volume of sterile tap water, quantitating the amount of *P. multocida* by standard pour-plate method using dextrose starch agar (Cruickshank, R. "Medical Microbiology," Williams and Wilkins Co., Baltimore, Md. 11th ed., 868-870, 1965), and exposing the birds on days 1, 8 and 15. Drinking water was withheld from the experimental turkeys for approximately 12 hours before exposure, to encourage prompt consumption of the inoculated drinking water. When vaccinating ET or SC, with or without adjuvant (Freund's incomplete, Difco), the same number of organisms were introduced each time vaccinations were done on days 1 and 8. Both vaccinated and control birds were challenged after 3 or 4 weeks with either of the five virulent *P. multocida* cultures (strain X-73, serotype 1; P-1059, serotype 3; P-1662, serotype 4; P-1702, serotype 5; B-1001, serotype 9). All turkeys in each experiment were observed daily for 21 days, and the mortality and morbidity were recorded. All dead and morbid turkeys (chronic cholera) were subjected to a postmortem and bacteriological examination to establish the presence of fowl cholera disease. Mortality and morbidity were added to arrive at the value for the total number dead.

Experiment 1. This experiment was designed to determine whether the live mutant strain M-2283 was immunogenic to turkeys when administered in the DW. Thirty-four 8-week old turkeys were vaccinated by DW on days 1, 8 and 15. Three weeks postvaccination, 17 vaccinated and 10 unvaccinated birds confined in one room were challenged with strain P-1059 by the IM method (Heddleston, K. L., J. E. Gallagher, and P. A. Rebers. Fowl cholera: immune response in turkeys. Avian Dis. 14:626-635. 1970). The immunity of the turkeys in the other room were challenged by the nasal-cleft method (Heddleston et al., supra).

Experiment 2. The results of experiment 1 confirmed (Heddleston et al., supra) that the method of challenging influenced the results, so this experiment was designed to compare the efficacy of two methods of challenge exposure. For each route of vaccination (ET, DW, SC and SC adjuvant), 16, 8-week old turkeys were used. Four weeks postvaccination, the vaccinated birds were divided into two groups of equal numbers and placed in two rooms with five unvaccinated controls. The birds in one room were challenged IM with a virulent P-1059 strain. The birds in the second group were challenged by contact exposure (Heddleston et al, supra) with the same strain of organisms.

Experiments 3, 4, 5, 6. These experiments were done to determine the spectrum of protection conferred by strain M-2283. For each experiment, 40, 9-week old turkeys were vaccinated. Twenty birds were vaccinated ET, and 20 via DW. Challenge doses were given 4 weeks later. In each experiment, protection against one of the virulent challenge strains (X-73, P-1662, P-1702, and B-1001) was compared with strain P-1059. When using X-73 and P-1059 as the challenge strains, the contact-exposure method was used. Because strains P-1662, P-1702 and B-1001 were of relative low virulence compared with P-1059 and X-73, the nasal cleft method was used to establish a more severe challenge.

Experiment 7. Since a broth culture of strain M-2283 was used as a vaccine in all the above investigations, an experiment was designed to determine whether the immunogen was associated with the live bacteria itself or was present extracellularly. An 11-hour culture (log phase) of M-2283 in dextrose starch broth (Difco) was centrifuged at 27,000 × g for 30 minutes in a Sorvall RC 2-B refrigerated centrifuge (Ivan Sorvall, Inc., Norwalk, Conn.) The supernate was filtered through a Millipore 0.22-micron filter (Millipore Corp., Bedford, Mass.) and this was used as the culture filtrate vaccine. Five turkeys each were vaccinated with the same dose by the ET, SC and SC with adjuvant. The vaccine given via the ET and SC routes was diluted with saline to equal the volume of the dilution caused by the adjuvant in the SC with adjuvant.

The sediment which contained the bacteria was washed and centrifuged three times in sterile phosphate buffered saline, pH 7.2 (PBS), to remove all residual medium contaminants. This sediment was then suspended in sterile PBS to give OD of 0.6 at 550 nm on a Coleman Jr. Spectrophotometer (Model 6D), and 0.5 ml of this suspension ($8 \times 10^6$ bacteria) was administered as a vaccine by the ET and SC routes. For vaccination by the SC with adjuvant method, a suspension giving an OD of 1.2 was used to compensate for the dilution factor caused by the adjuvant. The culture filtrate and bacterial vaccine were administered on days 1 and 8. Four weeks postvaccination these groups and a control group were challenged with the P-1059 strain via contact exposure challenge.

Experiment 8. Since the previous results showed that the M-2283 vaccine administered by DW and ET conferred a high degree of local protection, not systemic, this experiment was performed to determine the difference in the invasive characteristics of strain M-2283 (avirulent) and the parent strain V-2283 (virulent). The technique of Pabs-Garnon and Soltys (Multiplication of P. multocida in the spleen, liver, and blood of turkeys inoculated intravenously. Can. J. Comparative Med. 35:147-149. 1971), was used and turkeys were inoculated with 5,000 organisms by the endotracheal route. Blood, spleen and liver samples were collected at 3, 6, 12, 24, 27, 30, 36, 48, 72, 96 and 120 hours for culturing purposes.

RESULTS

Experiment 1. Table 1 presents the results of turkeys vaccinated by DW and challenged by two different methods. All vaccinated and control birds challenged IM with 500 P-1059 organisms died within 12 days. All controls challenged by nasal-cleft also died. The vaccinated birds showed only 29 percent mortality (71 percent survival).

Experiment 2. This experiment revealed that the ET and DW vaccinated birds, when challenged IM, had 100 percent mortality, as did the controls (Table 2). Turkeys vaccinated by SC and SC adjuvant respectively showed 37 percent and 12 percent survival when challenged IM, and 50 percent and 37 percent survival when challenged by contact exposure. However, turkeys vaccinated by the ET and DW methods and challenged by contact exposure respectively showed 100 percent and 87 percent survival, compared with 0 percent survival of control unvaccinated turkeys.

Experiments 3, 4, 5, 6. Table 3 presents results of the spectrum of protection conferred by the vaccine administered by the ET and DW methods. Endotracheally vaccinated turkeys showed 80 percent protection against strain X-73, and 100 percent protection against strains P-1059, P-1662, P-1702, and B-1001. Turkeys vaccinated by the DW method showed only 60 percent protection against X-73, 80 percent protection against B-1001 and P-1059, and 90 percent protection against P-1662 and P-1702.

Table 1

Efficacy of P. multocida strain M-2283 as a live vaccine in the drinking water

| Room No. | Culture Vaccine[A] route | Challenge | Challenge exposure method | Survived (%) | No. dried/no. exposed |
|---|---|---|---|---|---|
| 1 | Drinking water | P-1059 | Nasal-cleft | 71 | 5/17 |
|   | None |  |  | 0 | 10/10 |
| 2 | Drinking water | P-1059[B] | Intramuscular | 0 | 17/17 |
|   | None |  |  | 0 | 10/10 |

[A] Turkeys were vaccinated on days 1, 8 and 15 with 5, 2 and 2 liters respectively containing $30 \times 10^6$, $35 \times 10^7$, and $38 \times 10^5$ bacteria/ml.
[B] 500 organisms of strain P-1059 contained in 0.1 ml was used as the IM challenge.

Table 2

Comparison of the protection induced by the live vaccine administered by different routes and challenged by the contact-exposure and intramuscular methods.

| Room No. | Vaccine route | Culture Challenge | Challenge exposure method | Survived (%) | No. died/no. exposed |
|---|---|---|---|---|---|
| 1 | Endotracheal[A] | P-1059 | Contact | 100 | 0/8 |
|   | Drinking water[B] |  |  | 87 | 1/8 |
|   | SC with adjuvant[A] |  |  | 37 | 5/8 |
|   | SC without adjuvant[A] |  |  | 50 | 4/8 |
|   | None |  |  | 0 | 5/5 |
| 2 | Endotracheal[A] | P-1059 | Intramuscular | 0 | 8/8 |
|   | Drinking water[B] |  |  | 0 | 8[C]/8 |
|   | SC with adjuvant[A] |  |  | 12 | 7[D]/8 |
|   | SC without adjuvant[A] |  |  | 37 | 5/8 |
|   | None |  |  | 0 | 5/5 |

[A] Turkeys were vaccinated on days 1 and 8 with $1 \times 10^7$ organisms.
[B] Turkeys vaccinated on days 1, 8 and 15 with 4 liters each day containing $19 \times 10^6$ organisms/ml.
[C] One bird had chronic cholera and was tabulated dead.
[D] Three birds had chronic cholera and were tabulated as dead.

Table 3

Comparison of the spectrum of protection induced by the live vaccine administered endotracheally or via drinking water.

| Room No. | Vaccine | Culture Challenge | Challenge exposure method | Survived (%) | No. died/no. exposed |
|---|---|---|---|---|---|
| 1 | Endotracheal[A] | P-1059[D] | Contact | 100 | 0/40 |
|   | Drinking water[B] |  |  | 80 | 8/40 |
|   | None |  |  | 4 | 24/25 |
| 2 | Endotracheal[A] | X-73 | Contact | 80 | 2/10 |
|   | Drinking water[B] |  |  | 60 | 4/10 |
|   | None |  |  | 0 | 5/5 |
| 3 | Endotracheal[A] | P-1662 | Nasal cleft | 100 | 0/10 |
|   | Drinking water[B] |  |  | 90 | 1/10 |
|   | None |  |  | 0 | 5/5 |
| 4 | Endotracheal[A] | P-1702 | Nasal cleft | 100 | 0/10 |
|   | Drinking water[B] |  |  | 90 | 1/10 |
|   | None |  |  | 0 | 5[C]/5 |
| 5 | Endotracheal[A] | B-1001 | Nasal cleft | 100 | 0/10 |
|   | Drinking water[B] |  |  | 80 | 2/10 |
|   | None |  |  | 0 | 5/5 |

[A] Turkeys vaccinated on days 1 and 8 with $10^6$ organisms.
[B] Turkeys vaccinated on days 1, 8 and 15 with 4 liters respecctively containing approximately $1.2 \times 10^6$, $5 \times 10^6$, and $17 \times 10^6$ organisms/ml.
[C] Two birds had chronic cholera and were tabulated as dead.
[D] Totaled from 4 experiments.

Experiment 7. The culture filtrate conferred no protection when administered parenterally (Table 4). However, a low degree of protection (20 percent) was observed with turkeys that received the filtrate ET. The bacterial suspension, on the other hand, conferred a very high degree of protection (100 percent) when administered ET and a somewhat diminished protection when administered parenterally (60 to 80 percent).

Experiment 8. The results from this experiment (Table 5) showed that strain V-2283 was present in the liver and spleen about 12 hours after ET inoculation, reaching its peak at 36 hours. P. multocida was detected in the blood after 27 hours and reached its peak number at 36 hours. All remaining (unsacrificed) turkeys infected with V-2283 with three exceptions died of fowl cholera within 48 hours. On day 7, the three survivors were sacrificed and P. multocida was isolated from the liver, spleen, and bone marrow from only one turkey. None of the turkeys inoculated with strain M-2283 had any significant number of organisms present in the blood, liver or spleen, thus demonstrating the loss of invasiveness. None of these turkeys died, and liver, spleen and bone marrow cultures of these sacrificed turkeys were negative for P. multicida. No attempts were made to quantitate the organisms in the trachea and lungs of these birds.

Table 4

Comparison of the efficacy of bacteria alone or culture filtrate as the immunogen.

| Room No. | Vaccine | Route | Challenge | Challenge exposure method | Survived (%) | No. died/no. exposed |
|---|---|---|---|---|---|---|
| 1 | Culture filtrate[A] | Endotracheal<br>SC with adjuvant<br>SC without adjuvant<br>None | p-1059 | Contact | 20<br>0<br>0<br>0 | 4/5<br>5/5<br>5/5<br>5/5 |
| 2 | Bacteria[B] | Endotracheal<br>SC with adjuvant<br>SC without adjuvant<br>None | P-1059 | Contact | 100<br>60<br>80<br>0 | 0/5<br>2/5<br>1/5<br>5/5 |

[A] Turkeys vaccinated twice on days 1 and 8 with same dose.
[B] Vaccinated twice on days 1 and 8 with $8 \times 10^6$ bacteria each time.

Table 5

Comparison of the numerical distribution of *P. multocida* in liver, spleen, and blood of turkeys infected with the virulent parent strain (V-2283) and the avirulent strain (M-2283)

| No. of turkeys | Strain of P. multocida | Hours after infection | Mean number of bacteria per gram or ml | | |
|---|---|---|---|---|---|
| | | | Liver | Spleen | blood |
| 40[B] | V-2283[A] | 3 | 0 | 0 | 0 |
| | | 6 | 0 | 15 | 1 |
| | | 12 | $3.8 \times 10^3$ | $8.4 \times 10^3$ | 1 |
| | | 24 | $1.8 \times 10^4$ | $6.8 \times 10^4$ | 3 |
| | | 27 | $5.22 \times 10^1$ | $4.9 \times 10^5$ | 60 |
| | | 30 | $1.87 \times 10^6$ | $8.74 \times 10^5$ | $1.56 \times 10^3$ |
| | | 36 | $1.768 \times 10^7$ | $1.87 \times 10^6$ | $6.6 \times 10^6$ |
| | | 48 | $3.1 \times 10^4$ | $6.8 \times 10^4$ | $6.6 \times 10^2$ |
| | | 72 | — | — | — |
| | | 96 | — | — | — |
| | | 120 | — | — | — |
| 40[C] | M-2283[A] | 3 | 1 | 0 | 0 |
| | | 6 | 0 | 0 | 0 |
| | | 12 | 0 | 1 | 0 |
| | | 24 | 0 | 0 | 0 |
| | | 27 | 0 | 0 | 0 |
| | | 30 | 0 | 0 | 0 |
| | | 36 | 0 | 0 | 0 |
| | | 48 | 1 | 1 | 0 |
| | | 72 | 0 | 0 | 0 |
| | | 96 | 0 | 0 | 0 |

[A] Turkeys were infected with $5 \times 10^3$ organisms endotracheally contained in 0.1 ml.
[B] Four turkeys were killed up to 48 hr, five more were dead at 48 hr, and 3 survived.
[C] Four turkeys were killed up to 96 hr. None of these turkeys died or were observed sick.

Containing the vaccine or consumed less than others did. Such has been observed to be very common behavior among turkeys even though deprived of water prior to vaccination. This discrepancy could be overcome experimentally on a small scale if the vaccine were administered endotracheally. The results have confined this hypothesis, in that the levels of protection against the five serotypes were consistently higher when the vaccine was administered endotracheally.

At the beginning of these studies, results revealed that the method of challenge influenced the results. Turkeys vaccinated by the DW and ET and challenged IM died (Expts. 1, 2). However, turkeys vaccinated by identical procedures and challenged by contact exposure had a very high degree of survival. Results also revealed (Expt. 2) that turkeys vaccinated by the parenteral route were less adequately protected against challenge by IM or contact exposure. The above findings led to speculation that the vaccine strain M-2283 when administered by DW or ET induced only the formation of localized (protective) antibodies in the respiratory system. From these results it was also hypothesized that the vaccine strain failed to disseminate to other tissues and thus there is a lack of systemic immunity (protective antibodies) in these tissues. This could explain the low level of protection observed in turkeys vaccinated by the parenteral route and the natural route (DW, ET) and respectively challenged by contact exposure and IM. This hypothesis was confirmed in Experiment 8, which showed that the parent strain V–2283 (virulent) behaved identically to any other virulent strain in that it was disseminated to and propagated in the liver and spleen before causing a bacteremia. The avirulent M–2283 strain lacked the disseminative property of the parent strain. This could be due to the lack of invasive properties of the M–2283 strain. It appears quite probable that the avirulent nature of this strain may be associated with a lack of aggressins (Smith, H. Biochemical challenge of microbial pathogenicity. Bact. 32:164–184. 1968) and thus the organism was destroyed by the defense mechanism of the host and failed to disseminate.

Heddleston et al. (supra) believe that the most desirable method of challenge was by contact exposure because it simulated a natural outbreak. Our results have shown that with strains P–1059 and X–73 the contact-exposure challenge works as well as the nasal-cleft method. When the challenge organisms are strains (Expts. 3, 4, 5, 6) P–1662, P–1702, and B–1001, however, the nasal-cleft method had to be used to obtain reproducible results. Hence, the avirulent vaccine in the drinking water described herein are considered as successful provided contact exposure and nasal-cleft challenge are both used to test its potency.

The immunogenic principle in strain M-2283 seems to be associated with the bacteria and was not present extracellularly (Expt. 7). Since the spectrum of protection was wide, the possible role of an endotoxin being involved as an immunogen seems remote. In the light of existing knowledge on the behavior of *P. multocida* in vivo, it is concluded that the immunogenic substance(s) from live strain M-2283 must be produced in vivo.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A method for prophlactic treatment of fowl cholera which comprises administering to poultry a vaccine comprising a small but effective amount of live stable avirulent antibacterial encapsulated *Pasteurella multocida* mutant strain M-2283.

2. A method according to claim 1 further characterized in that the vaccine is administered orally.

3. A method according to claim 2 further characterized in that the vaccine is administered by admixture in drinking water.

4. A method according to claim 3 further characterized in that said poultry is turkeys.

* * * * *

PO-1050
(5/69)

UNITED STATES PATENT OFFICE
CERTIFICATE OF CORRECTION

Patent No. 3,855,408     Dated December 17, 1974

Inventor(s) S. K. Maheswaran

It is certified that error appears in the above-identified patent and that said Letters Patent are hereby corrected as shown below:

Column 1, line 9, "United Stated" should be --United States--.

Column 1, line 35, "insolating" should be --isolating--.

Column 1, line 53, "trails" should be --trials--.

Column 2, line 2, after "drinking" --water-- is omitted.

Column 7, preceding line 43, the following was omitted:

--The results indicate that strain M-2283 has the potential to be an efficient live vaccine in the drinking water. One of the disadvantages of the DW vaccine is that it does not confer 100 per cent protection against various serotypes. A possible reason may be that some turkeys in the experimental flock either did not consume any drinking water--.

Column 7, line 43, "Containing" should be --containing--.

Column 8, line 55, after "Bact." --Rev.-- is omitted.

Table 1, the heading "No. dried/no exposed" should be --No. died/ No. exposed--.

Table 3, footnote B, "respecctively" should be --respectively--

Table 5, in the column under "Liver", 5th line, "$5.22 \times 10^1$" should be --$5.22 \times 10^5$--.

Signed and sealed this 1st day of April 1975.

(SEAL)
Attest:

RUTH C. MASON
Attesting Officer

C. MARSHALL DANN
Commissioner of Patents
and Trademarks